No. 651,892. Patented June 19, 1900.
G. SCHNEIDER.
COUNTING DEVICE.
(Application filed Aug. 21, 1899.)

(No Model.)

Witnesses:
Hans Brunner
Paul Siebert

Inventor:
Georg Schneider
per Gerson & Sachse
his Attorneys.

UNITED STATES PATENT OFFICE.

GEORG SCHNEIDER, OF SCHWARZBACH-EISFELD, GERMANY.

COUNTING DEVICE.

SPECIFICATION forming part of Letters Patent No. 651,892, dated June 19, 1900.

Application filed August 21, 1899. Serial No. 728,024. (No model.)

*To all whom it may concern:*

Be it known that I, GEORG SCHNEIDER, a subject of the Emperor of Germany, and a resident of Schwarzbach-Eisfeld, in the Empire of Germany, have invented certain new and useful Improvements in Counting Devices, of which the following is a specification.

My invention relates to a new and improved counting device particularly adapted as an aid in learning to add, subtract, &c., by presenting directly to the eye in concrete form a plurality of similarly-formed objects, thereby eliminating the necessity of a youthful mind trying to comprehend the results from abstract reasoning.

Figure 1:
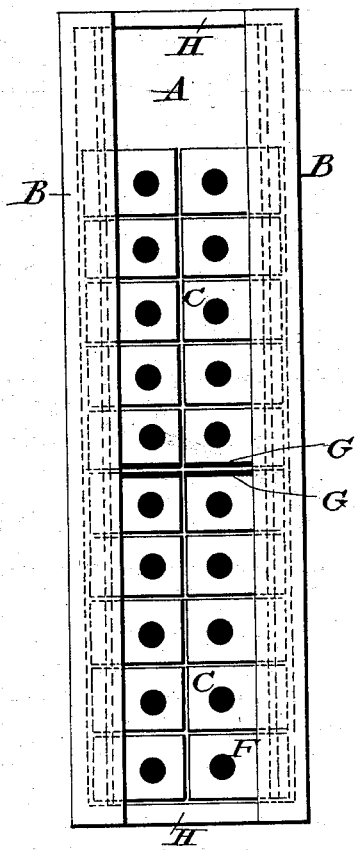
Figure 2:
Figure 3:
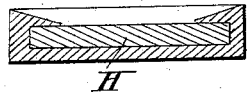

In the accompanying drawings, which form a part of this specification, and in which similar letters refer throughout to similar parts, Figure 1 is a plan view of my invention. Figs. 2 and 3 are cross-sections.

In constructing my invention, which while simple is yet durable, I employ an oblong base A, having secured to its longer sides parallel strips B, having inwardly-projecting flanges $b$, as shown plainly in Fig. 2. These flanges are preferably beveled and painted some dark color unharmful to the eyes, serving to bring out in strong contrast the light-colored objects C. These objects or blocks C are arranged in two parallel rows having their edges adjacent, while the rear portion of each block extends rearwardly beneath the said flanges, respectively, the blocks being prevented from slipping out by two elongated guides E, fastened to said base A and lying parallel to the said strip B and entering small grooves formed in the said blocks. Secured to the upper surface of each of the said blocks, which, as hereinbefore mentioned, are preferably of some light color for sake of contrast, is placed a small dark button F, which serves to still further aid in attracting instant attention, while the middle point of each row (here between the fifth and sixth) is indicated by a dark strip G for the further aid in counting. Fitting in each end of said base and between said strips is an end piece H, which prevents the blocks from being slipped out of their proper position. It will be seen from Fig. 1 that the blocks do not completely fill the space formed by the base and strips; but there is a certain space remaining by means of which the blocks can be moved backward and forward, indicating the different calculations and constantly presenting to the eye certain contrasted objects, which greatly aid the youthful mind in determining the correct results.

While showing here one form of construction of my invention, I do not limit myself thereto, but may construct the device in combination with a pen-box, &c., or other suitable objects which children usually employ at school.

Having now described my invention, what I claim as new, and desire to protect by Letters Patent, is—

1. In a new and improved counting device particularly adaptable as an aid in learning to add, subtract, &c., the combination of a base-plate, strips thereon, movable blocks between said strips, guides in said base engaging said blocks, and buttons on said blocks, substantially as described.

2. In a new and improved counting device particularly adaptable as an aid in learning to add, subtract, &c., the combination of a base-plate, parallel strips thereon, dark beveled flanges on said strips projecting inwardly, a plurality of blocks arranged in rows and extending under said flanges respectively, parallel guides in said base-plate engaging said blocks, end pieces on said plate and buttons on said blocks substantially as described.

GEORG SCHNEIDER.

Witnesses:
 ALVIN FLORSCHUTZ,
 FRIEDRICH HAAS.